Nov. 20, 1956
J. C. MARSH
2,771,162
ADJUSTABLE WHEEL CHOCK
Filed April 14, 1952
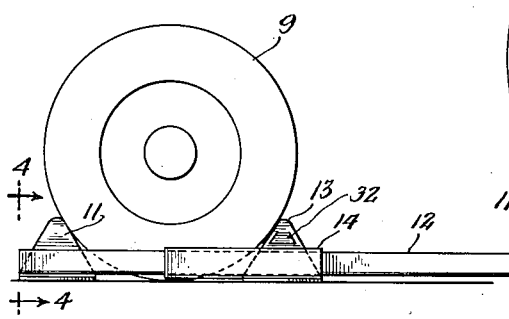
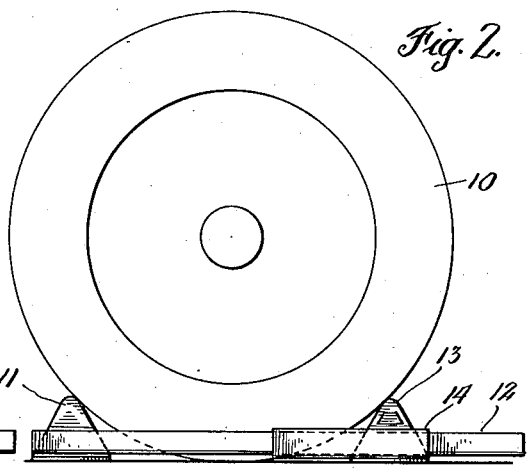
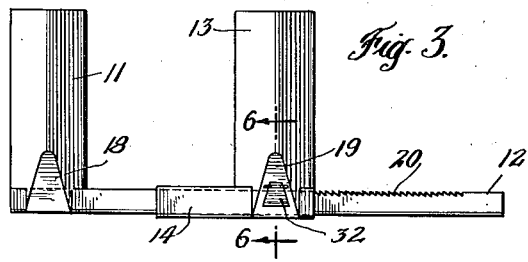
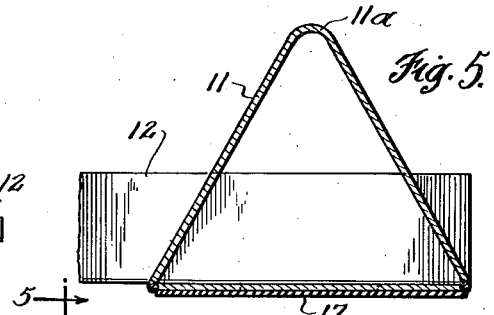
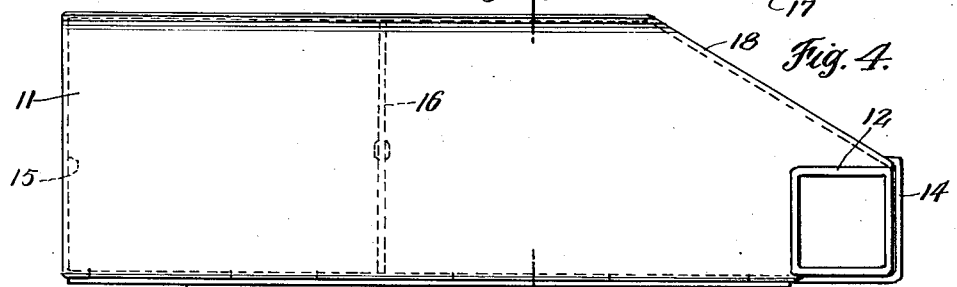
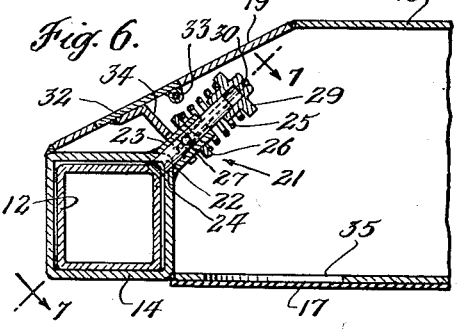
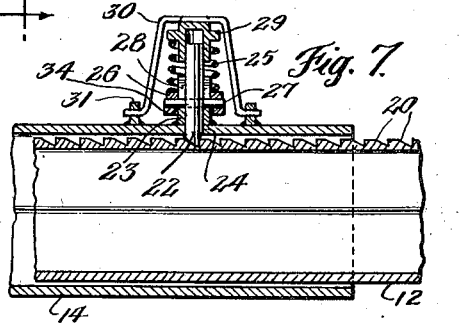
INVENTOR
John C. Marsh
BY Harris S. Campbell
ATTORNEY

United States Patent Office 2,771,162
Patented Nov. 20, 1956

2,771,162
ADJUSTABLE WHEEL CHOCK

John C. Marsh, Willow Grove, Pa., assignor to Eastern Rotorcraft Corporation, Neshaminy, Pa., a corporation of Pennsylvania Application April 14, 1952, Serial No. 282,180

3 Claims. (Cl. 188—32)

This invention relates to wheel chock devices and is particularly concerned with adjustable chocks suitable for use with airplane wheels having pneumatic tires.

In handling aircraft on the ground and properly locating them and securing them in parked position against accidental movement, it is desirable to use a chock device which may be quickly set in place to prevent the wheels moving in either direction. Particularly in handling of military aircraft, the chock devices used should be quickly adjustable to different sizes of tires. One of the principal objects of the present invention is the provision of a simply constructed, quickly adjustable chock for this purpose.

Another object of this invention is the provision of a rugged chock which may be subjected to hard usage and abuse while still retaining proper operational characteristics. This object includes the provision of a wheel chock assembly constructed of metal but fabricated in a manner which, while giving adequate strength, results in relatively light weight.

A further object of this invention is the provision of a wheel chock construction in which provision is made against accidental slippage of the chock while in position under the wheel, such as sometimes occurs due to insufficient frictional contact between the chock and the surface on which it rests.

A still further object of the invention is the construction of a wheel chock assembly of the type referred to above which incorporates a special shape or contour to protect the vital portions of the chock against damage in the event that it is run over by a truck or other vehicle while resting on hard runway surfaces.

Still another object of the invention is the provision of special latch mechanism for the retention of the chock in adjusted position, which mechanism is totally enclosed inside the chock itself. An operating lever flush with the surface is used to eliminate projecting parts which might be subject to damage.

How the foregoing and other objects and advantages of the invention are accomplished will be clear from the following description of the drawings, in which—

Figure 1 is a side elevational view of the chock in position against a small diameter wheel.

Figure 2 is a side elevational view as Figure 1 but showing the chock in adjusted position against a large diameter wheel.

Figure 3 is a plan view of the chock assembly.

Figure 4 is an enlarged elevational view taken in the direction of arrows 4—4, Figure 1.

Figure 5 is an enlarged sectional view taken through the wheel engaging portion of the chock in the direction of arrows 5—5, Figure 4.

Figure 6 is an enlarged sectional view taken in the direction of arrows 6—6, Figure 3, showing the latch construction.

Figure 7 is a view taken in the direction of arrows 7—7, Figure 6, showing additional details of the latch.

Referring to Figures 1 and 2 it will be seen that the wheel chock of the present invention may be applied to wheels of different size. These figures illustrate the general manner in which the chock is used including the sliding adjustment. Figure 1 illustrates the application of the chock to a relatively small wheel incorporating tire 9 while Figure 2 illustrates the chock in position against a relatively large wheel carrying tire 10. The chock unit consists of a barrier member 11 which is rigidly connected at one end to a frame or beam member 12. Another barrier member 13 is connected at one end to a socket 14 adapted to fit over the beam member 12 for controlled sliding motion therewith.

The details of construction will be more clearly understood by referring to Figures 3 to 7, inclusive. In the embodiment shown the frame member 12 has a square cross section and the socket member 14 is of square tubular section of a size which fits over frame member 12 to provide freely sliding engagement.

It will be noted that the barrier members 11 and 13 are generally triangular in cross section resulting in an obstruction which will engage the wheel at the upper edge of the barrier member to make a difficult obstacle over which the wheel will not readily climb. The angle of the barrier is selected so that for the smallest size wheel used with the chock the slope will be approximately tangential with the wheel. When the chock is used with a large diameter wheel as illustrated in Figure 2, the wheel will contact the upper portion of the chock members, a rounded top 11a being provided to prevent damage to the chock or the wheel due to pressure between them. The chock member, as well as the other parts of the assembly, are preferably made of robust metal construction to withstand hard usage. This construction permits the use of welding to provide rigid connections between the various structural parts, for example, between chock member 11 and frame 12, and chock member 13 and socket member 14.

The ends of the barrier members 11 and 13 are preferably closed by means of walls 15 to provide additional stiffness and to prevent the entry of dirt to the interior of the chock member. Preferably additional stiffening in the forms of diaphragms 16 is used to provide adequate strength against collapse of the barrier structure even though its shell may be made from relatively light sheet metal in the interest of the conserving weight to provide an easily handled chock unit.

In order to increase the effectiveness of the chock against slippage when used on a slippery surface, such as an airplane runway surface or the metal deck on an aircraft carrier, the lower surfaces of the chock members 11 and 13 are provided with an anti-skid covering 17, this being shown more clearly in Figures 4, 5 and 6. This covering incorporates a rough surface of gritty material such as powdered Carborundum, or the like, which provides excellent frictional characteristics even on relatively smooth or hard surfaces.

It will be observed at the end of the chock structure next the frame member 12 that each barrier member 11 and 13 is constructed with a sloping portion 18 and 19. This construction provides a special function which prevents the chock from being damaged under certain circumstances. It will be noted that in the normal position of the chock with the under surface 17 on the ground, the frame member 12 lies close to the supporting surface so that in the event the chock unit is run over by a vehicle, such as a truck or a taxiing airplane, the frame 12 will be deflected only a small amount after which it is supported by the ground against further deflection. Thus the frame member is not deflected sufficiently to cause permanent deformation so that no damage results. Likewise, in case the chock is accidentialy left lying in the inverted position, that is, with the rounded upper edges 11a in contact with the ground surface, the inclined surfaces 18 and 19 operate to prevent damage to the frame 12. In the event that the chock is run over by vehicle while in this inverted position the load on frame 12 will cause the chock to tilt and lie on its inclined surfaces 18 and 19 until the corners of the frame member 12 comes into contact with the ground surface. In this position the frame 12 again receives support from the ground so that the wheel may pass over without causing it to be bent.

The mechanism for the adjusting of the chock and retaining it in position is relatively simple. In Figure 3 it will be seen that ratchet teeth 20 are shown on one corner of the frame 12. Attached to the socket member 14 is a ratchet structure 21 which is clearly illustrated in Figures 6 and 7. The ratchet mechanism consists of a pawl 22 supported in a cylindrical socket 23 attached to the corner of the square tube 14. A hole 24 in member 14 permits the pawl 22 to project into and engage the teeth 20. In order to urge the pawl 22 into engaged position, compression spring 25 is mounted to react against washer 26 which in turn engages pin 27 projecting through the pawl 22 and the slot 28 in socket 23. To carry the reaction of the spring, cap member 29 fits over the upper end of the pawl 22 and is held in position by means of a rod or frame 30 which is anchored to the square tube 14 by means of blocks 31.

To operate the latch 21, a small flush door 32 is mounted by means of pivot 33 to the inclined surface 19. Projecting fingers 34 engage the end of the pin 27 so that when the door 32 is pressed the pawl 22 is raised. In this manner the pawl is disengaged from the teeth 20 to permit movement of the barrier member 13 along the frame 12 in a direction away from the barrier 11.

The construction described above for the latch may be assembled through hole 35 in the bottom of barrier member 13. The latch member 22 is first inserted after which the washer 26 and spring 25 compressed by moving the cap member 29 down to a position where the frame 30 may be swung over it. The spring pressure then forces a notch in cap 29 against the frame 30 to retain it in proper assembled position. After assembly of the latch the lower abrasive material 17 may be cemented to the bottom of the barrier member 13 thus closing the opening 35 against the entrance of dirt.

Operation of the chock assembly is relatively simple since the chock may be first extended by pressing on the latch release member 32 to provide a sufficient distance between members 11 and 13 to allow it to be freely placed in position at the ground line of the wheel which is to be chocked. The barrier 13 is placed against one side of the wheel and by exerting a closing pressure to the barrier member 11, it may be slid easily into position against the other side of the wheel since the latch member 22 may move freely over the ratchet teeth 20 when moved in the closing direction. When it is desired to release the chock this may be readily accomplished by pressing on the release latch 32 and moving the barrier 11 away from the barrier 13 to the extent necessary to withdraw the chock from the wheel.

While a chock of this nature is particularly useful in connection with maintaining aircraft in position either on parking areas at flying fields or on aircraft carrier decks, it may also be used for other vehicles, for example, where they are being transported on ferries or the like. The quickly adjustable feature provides for use with all normal sized wheels whether they are on a passenger vehicle or small airplane or on a large truck or transport plane. Making the structure of the chock from metal materials provides for a strong unit which requires a minimum service to keep it in operation. The special feature of applicant's chock which prevents bending the side frame even though the chock may be inadvertently run over while being in inverted position gives protection against expensive damage to this equipment. The special shape of the barrier members which provides for good holding characteristics regardless of size of wheel assures effective chocking action and this is further enhanced by the use of the abrasive lower surface to give the chock its full holding action regardless of the nature of the surface on which it may be used.

I claim:

1. An adjustable wheel chock having two wheel engaging members, a frame, the end of one of said members being attached to said frame to extend from one side thereof, a sliding element supported on said frame, said element being attached to the end of the second wheel engaging member on the same side of said frame as the first member, a latch mechanism attached to said element including a plunger cylinder, a plunger having a part projecting from the wall thereof, said plunger being supported in said cylinder, a cylindrical cap proportioned to fit over the upper end of said plunger, a helical spring reacting between said cap and said projecting part to apply a spring load to said plunger, and a swingable rod support to hold said cap in position against the spring force.

2. An adjustable wheel chock having two wheel engaging members, a square section frame to which one of said members is attached, a square section sleeve slidably mounted on said frame, said sleeve having the other of said members attached thereto, a retention mechanism having a plunger supported on said sleeve at a corner thereof at an angle approximating forty-five degrees to permit said plunger to apply a retention load at the corner of said frame, said mechanism being located inside said other wheel engaging member.

3. An adjustable wheel chock having two wheel engaging members, one of said members having one end attached to a frame, the other of said members having one end attached to a sleeve which is slidably supported on said frame, said other member having a surface angularly disposed with respect to a plane through the bottom surfaces of said wheel engaging members, said surface being located at the end of the member above said sleeve, a latch device mounted on said sleeve within said other member, said surface having an opening therein, a latch release part mounted in said opening and having an internally projecting arm connected to said latch device, said release part being pivotally carried by said other member and being shaped to close the opening in said surface.

References Cited in the file of this patent

UNITED STATES PATENTS

| | | |
|---|---|---|
| 213,203 | Jewell | Mar. 11, 1879 |
| 324,803 | Bancroft | Aug. 25, 1885 |
| 770,510 | Stullken | Sept. 20, 1904 |
| 781,963 | Miller | Feb. 7, 1905 |
| 801,559 | Tarr | Oct. 10, 1905 |
| 1,765,826 | Disibio | June 24, 1930 |
| 2,011,469 | Brueggemann | Aug. 13, 1935 |
| 2,442,023 | Schwarzhoff | May 25, 1948 |
| 2,491,989 | Lind | Dec. 20, 1949 |
| 2,548,248 | Wiebe | Apr. 10, 1951 |
| 2,591,348 | George | Apr. 1, 1952 |
| 2,656,864 | Hopfeld | Oct. 27, 1953 |

FOREIGN PATENTS

| | | |
|---|---|---|
| 675,784 | France | Feb. 14, 1930 |